MINIATURE CROSSBAR SWITCH WITH FLEXIBLE TAPE SELECTING MEANS AND MECHANICAL LATCH

Filed Oct. 9, 1967 5 Sheets-Sheet 1

Inventors
CHARLES VAZQUEZ
G.C. DUFRESNOY
By
Attorney

Sept. 15, 1970 C. VAZQUEZ ET AL 3,529,113

MINIATURE CROSSBAR SWITCH WITH FLEXIBLE TAPE SELECTING MEANS AND MECHANICAL LATCH

Filed Oct. 9, 1967 5 Sheets-Sheet 5

United States Patent Office 3,529,113
Patented Sept. 15, 1970

3,529,113

MINIATURE CROSSBAR SWITCH WITH FLEXIBLE TAPE SELECTING MEANS AND MECHANICAL LATCH

Charles Vazquez and Guy Claude Dufresnoy, Paris France, assignors to International Standard Electric Corporation, New York, N.Y., a corporation of Delaware Filed Oct. 9, 1967, Ser. No. 673,791
Claims priority, application France, Oct. 20, 1966, 80,753
Int. Cl. H01h 63/00
U.S. Cl. 200—175 16 Claims

ABSTRACT OF THE DISCLOSURE

The invention provides a crossbar switch mounted on a printed circuit card. In greater detail, the printed circuit card supports a lightweight plastic frame having a number of coiled springs stretched across its top side to provide bare wire verticals. The moving contacts are short lengths of tightly wound, coiled, finger springs standing upright in the printed circuit card and normally resting in an open contact position away from the bare wire verticals owing to their own spring tension. The crosspoint contacts are closed by a coordinate array of plastic tapes having escapement windows therein. These tapes capture the finger springs and pull them to a closed contact position when intersecting tapes are sequentially and momentarily pulled responsive to the receipt of pulses from electronic control circuitry. If the tapes are pulled nonsequentially, the captured finger spring escapes and returns to the open contact position.

This invention relates to miniature crossbar switches having mechanical latches in which the operated crosspoints are held without any further expenditure of electrical energy after the crosspoint has been operated.

In the telecommunications field, switching systems make use of crossbar switches that are generally mounted in equipments called multiselector frames. In such equipments, the operation of a crosspoint generally results from a sequential movement of a first element or select bar followed by the movement of a second element or hold bar (also called a connection bar in some countries). Usually, this crosspoint is thereafter held operated by a retention of the hold bar in its off-normal position, which requires a continuous energization of a hold magnet throughout the duration of the call. This entails a relatively important expenditure of electric energy. Almost more important, the expenditure of energy is variable since it depends upon the length of time during which the crosspoint must remain operated and that time varies greatly during the course of the day. This variability causes an inefficient use of the power supply.

In order to avoid this expenditure of energy and inefficient power supply usage, hold bars have been used with magnetically latching electromagnets. These magnets usually have stteel cores which keep a residual magnetization that is sufficient to latch the associated hold bar in an off-normal position after the disappearance of the energizing control impulse. Thereafter, the hold bar can only be released by demagnetizing the core responsive to a demagnetizing flux which opposes and cancels the residual flux. However, such magnetic latching causes difficulty in calibration and in the shaping of the impulse of current which produces the demagnetizing flux. Moreover, the magnetically latchable cores are generally made from a material which is difficult to machine and which is subject to crumbling under shock. Another important point is that the associated control circuits have to be designed so that the magnetically latched hold magnets are re-selected and then energized by the demagnetizing flux in order to release the connection. This means a great increase of logic circuits as compared with other systems wherein the logic only has to make the original selection and does not have to select and release each crosspoint.

Conventionally, these and other crossbar switches are fairly massive structures, by today's standards, having many mechanical parts (such as brackets, bearings, magnets, etc.) mounted thereon. This structure and these parts are made on large and expensive machine tools. Thus, any manufacturer who wishes to enter the business must first raise the capital reuired to pay the almost prohibitive entry costs. Likewise, there is an almost prohibitive cost for any manufacturer wishing to change the switch configuration after production tools are in place. Also, the mechanical parts must have at least a minimum strength, be large enough to manipulate during manufacture, stand up under years of almost constant operation, etc. Therefore, there is a practical and economical limit to how small a conventional switch may be made. Since, as a practical matter, conventional switches cannot be made smaller than a certain economical size, they must carry enough crosspoints to justify the expense of the inherently necessary equipment. This, in turn, results in a large size switching matrix, and that, in turn, imposes constraints upon the network design, which precludes a maximum efficiency in the utilization of crosspoints.

Finally, many people believe that the future of switching lies in the development of electronically controlled, space division switches. These electronic controls will be manufactured by modern techniques, as by using automatic machines for mounting components on printed circuit cards, for example. Obviously, it would be highly desirable to provide a crossbar switch which could also be manufactured by use of the same modern techniques and on similar machines.

Accordingly, an object of the invention is to provide new and improved crossbar switches. In particular, an object is to provide miniature switches. Here, an object is to provide a switch design which will enable a manufacturer to select any convenient configuration of crosspoints.

A further object is to provide a crossbar switch that may be driven responsive to pulses from electronic control circuits. Another object of the invention is to latch operated crosspoints without requiring any continuous expenditure of electrical energy and without using magnetic latching.

Still another object is to reduce the cost of installing or changing a crossbar switch production line. Stated another way, an object is to enable the production of small switches and the changing of switch capacity even after a production line is set up and put into operation. Here, an object is to produce crossbar switches on tools and with techniques which are compatible with the tools and techniques used to produce electronic circuits mounted on printed circuit cards. In particular, an object is to produce a crossbar switch mounted on printed circuit cards.

In accordance with an aspect of this invention, the frame of a miniature crossbar switch is made from a lightweight plastic supported on a printed circuit card. The select and hold bars are a coordinate array of plastic ribbons or tapes stretched across the frame and arranged to be pulled by operating magnetic devices acting against the force of a return spring. The select fingers are tightly wound, coiled springs inserted into and soldered on the printed circuit card by conventional printed circuit card insertion and solder techniques. The verticals are springs stretched across the width of the plastic frame and inserted into the printed circuit card with the individual coils of the stretched spring being separated by a distance which is slightly less than the outside diameter of the tightly wound finger springs. This means that the finger spring will make electrical contact on at least two points, thereby providing the highly desired reliability of twin contacts. Moreover, the partial entry of the finger spring into the undulations of the stretched spring causes a wiping action which tends to make the contacts self-cleaning.

The switch verticals and the select finger springs are made from the same original stock of coiled spring material so that there cannot be any significant difference in the metals of the two working contact members, thus helping to eliminate such things as electrolysis and thermoelectric currents.

In operation, the plastic tapes normally rest in a released position wherein they are held taut by the pulling action of a return spring. Each finger spring projects through escapement windows at the intersections of the tapes. The natural finger spring bias holds it away from the stretched spring and in an open contact position. Then, the two electro-magnets controlling two intersecting tapes extending in perpendicular directions are momentarily operated in a sequence to pull the tapes and capture the finger spring in the escapement window at the intersection of the two tapes. When the magnets are released, again in proper sequence, the return springs pull the two tapes back to their normal positions. As they return, one of the tapes pulls the captured finger spring into a closed contact position against the stretched spring. Thereafter, the contact remains closed as long as nothing further happens. However, when the tape which captured the finger spring is again pulled, and the other intersecting tape is not pulled, the captured spring escapes and returns to its normal open contact or released position owing to its own internal spring bias.

As will become more apparent, it is possible to release a previously captured finger spring while capturing another spring. Thus, it is only necessary to recognize idle conditions—it is not necessary to mechanically release the crosspoints when they become idle. Therefore, the release logic is minimized as compared with the logic required to select and to mechanically release magnetically latched crosspoints before they may be reoperated.

The above mentioned and other features and objects of this invention and the manner of obtaining them will become more apparent, and the invention itself will be best understood by reference to the following description of an embodiment of the invention taken in conjunction with the accompanying drawings, in which.

The French Pat. No. 1,408,337 filed July 2, 1964, describes a device which includes a combination of two movable control pieces—such as select and hold bars. The consecutive and sequential movements of these pieces operate a movable contact element to close an electrical crosspoint. There is no need for the help of any intermediate or coupling pieces. However, the electrical connections thus established could only be held by holding the second movable control piece—or hold bar—in its operated position. This, in turn, required the continuous application of a holding voltage to the electro-magnet device controlling the movement of this control piece. This and other disadvantages of the prior art switches are overcome by the inventive switch through its use of a mechanical latching of the operated crosspoint—the latching being accomplished in a simple, economical, and efficient manner responsive to the sequence of the control bar operations.

Figure 1:
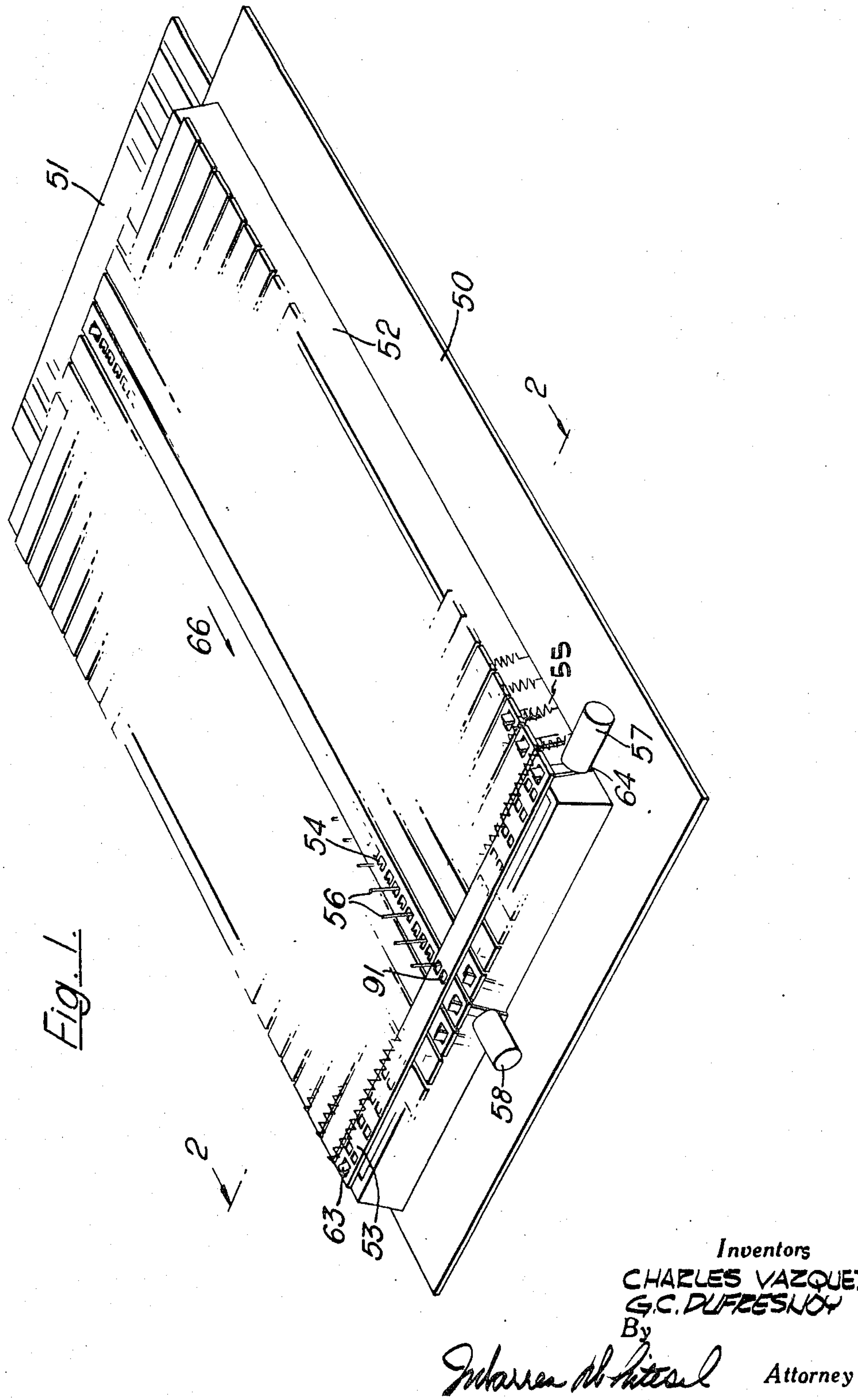
FIG. 1 is a perspective view of a miniature crossbar switch mounted on a printed circuit card—in the interest of clarity, this figure omits any components which are not required for an understanding of the invention.

Briefly, FIG. 1 shows an exemplary miniature crossbar switch incorporating the principles of the invention. The major elements in this switch are a printed circuit card 50 having a connector 51 attached to one end. A small lightweight plastic frame 52 is positioned on, and supported by, the printed circuit card. Stretched over this frame is an orthogonal array of select and hold "bars" such as 53, 54, respectively. Adjacent and parallel with each select bar (such as 53) is a stretched spring (such as 55) which forms a bare wire vertical contact. In an escapement window at the intersect of each select and hold bar, there is a finger spring (such as 56) which may be brought into contact with the bare wire vertical contact responsive to a sequential operation of the select and hold bars which intersect at that crosspoint.

In greater detail, the printed circuit card 50 carries a plurality of horizontal conductors for the finger springs on one side. On the other side, the printed circuit card carries the conductors required to operate the select and hold magnets, such as 57, 58, respectively. These magnets may be mounted on either the printed circuit card 50 or the frame 52; however, the preferred mounting is that shown in FIG. 2. While FIG. 1 shows only two of these magnets, it should be understood that one is provided for each of the select and each of the hold bars.

The select and hold bars are tapes or ribbons made from plastic or other suitable materials, such as Mylar, nylon, or the like. While any number of these tapes or ribbons may be used, one embodiment of the switch includes eight for each coordinate direction. Each tape is held taut between resilient mounts which are biased to a normal position by return springs (two of these mounts are shown at 63, 64). Also, one of the mounts either forms or is associated with an armature for individually pulling the select and hold bar attached thereto. For example, the magnet 58 is energized to pull the associated armature 64 and the hold bar 54 in the direction of the arrow 66. When the magnet is deenergized, the associated hold bar 54 returns to normal under the urging of the return spring. In like manner, every other select and hold bar is also held taut between two resilient mounts which are urged to a normal position by means of a return spring.

A single piece part is used to make both of the electrical contact elements. In form, it begins as a tightly wound coil spring made from a material having a good electrical contact characteristic. The tightly wound spring is thereafter cut into a plurality of short lengths to form the finger springs (such as 56) which are then inserted, at one of their ends, into the printed circuit card 50. Thereafter, the finger springs are soldered into place. Thus, normal printed circuit manufacturing machines and techniques may be used to make this assembly. To provide the verticals 55, other cut lengths of the tightly wound coil spring are stretched so that the individual turns of the spring are pulled apart by a distance which is slightly less than the diameter of the tightly wound spring. This way, the finger spring, which travels in a direction perpendicularly to the length of the stretched spring, may be brought up to touch against the turns of the stretched spring. Since the springs touch at two points, they make electrical contact at two separate poins to provide win contact reliability. The stretched spring is mounted on the switch by being attached to the printed circuit card 50 on either side of the frame 52. Again, conventional printed circuit card manufacturing techniques are also used to insert and attach the stretched springs.

With this broad description in mind, the reader will become better acquainted with the details of the inventive crossbar switch by a study of FIGS. 2–11.

Figure 2:
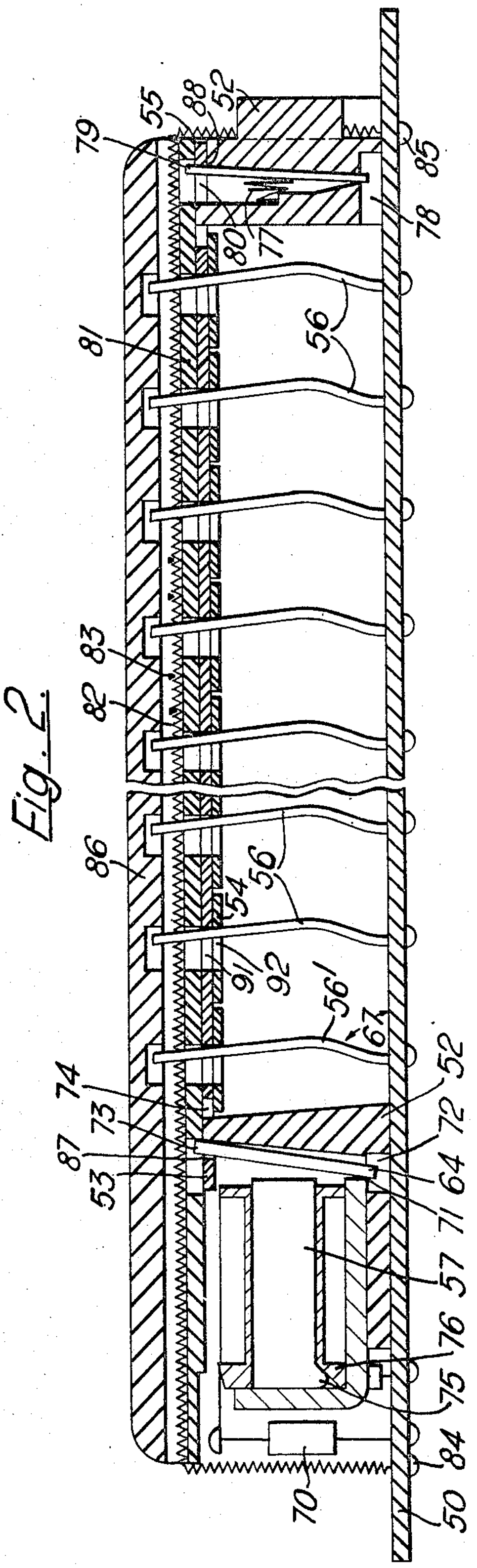
FIG. 2 is a cross-sectional view (taken on the longitudinal axis 2—2 of FIG. 1) showing a select bar and associated elements of a crossbar switch.

FIG. 2 is a cross-sectional view taken along line 2—2 of the crossbar switch of FIG. 1 and along the longitudinal axis of a select bar and other parts which are associated with the select magnet 57. Only a single select bar is visible in FIG. 2, but it is evident that many other similar bars are juxtaposed in a spaced parallel relation, as in conventional crossbar switches. Disposed perpendicularly to these select bars, are a number of hold bars, one of which is shown at 54. The lower part of the crossbar switch is formed by a double faced printed circuit card 50. Among other things, this card supports the movable contact elements or finger springs, such as 56.

The finger springs are deformable elastic elements having a good characteristic for conducting electricity. Preferably they are made in the form of a tightly wound helicoid with edge-to-edge pressure between adjacent turns. One end of each of these springs is held in the printed circuit card 50 by a bit of solder applied in any appropriate manner. The anchoring in the printed circuit card is made in a manner such that the finger springs are normally inclined away from the vertical so that they abut at an angle, as shown at 67. This inclination gives a bias to the finger springs which urges them to an open contact position. Since the turns of these springs are circular, the other end of the spring is free to move in any direction, and the mounting angle 67 is not at all critical.

The free ends of the finger springs project through escapement windows in the select and hold bars. The form of the windows or apertures is best seen in the plan views, particularly in FIGS. 3 and 4. These window devices present a very great advantage because they enable a use of bars having a minimum inertia for a given mechanical strength and rigidity. In other terms, this arrangement uses light bars made from a thin and supple material, such as, for example, a polyester ribbon. From this, the switch may operate at a very high speed and with a very small rebound of the contact elements, both of these characteristics being desirable for electronic operations. Furthermore, a reduction in wear can be obtained.

The frame 52, preferably made from a molded plastic material, is mounted on the printed circuit card 50, as by means of screws, for example. This frame 52 includes housings for the electromagnets, such as 57, the windings of which are connected to conductive strips on the printed circuit card 50. A diode 70 is individual to each electromagnet winding and is used to provide isolation at common connecting points.

Each electro-magnet acts upon an armature 64 which pivots on the edge 71 of the end of the magnet shunt structure. The fixed end of the armature 64 also penetrates slightly into an appropriate opening 72 in the frame 52. The free or active end 73 of the armature 64 engages the leading edge of a window 74 in the select bar 53 in a manner such that the select bar is pulled by armature 64 when the electromagnet 57 is energized. The core of magnet 57 has a chamfered part 75 which fits into an indentation of similar profile within the body of a coil bobbin 76. This holds the core 54 in place by preventing any longitudinal displacement along the axis of the bobbin.

The frame 52 also provides a seating and housing for both the return spring 77 which holds the select bars taut and the support bearing 78 of a spring follower 79. The bearing edge of this opening 78 plays the part of a hinge while the upper end of follower 79 cooperates with the trailing edge of window 80 in the select bar 53.

A similar arrangement is provided for each of the select and hold bars which are similar to the bars 53 and 54.

Attached to the top of the frame 52 is a plate 81 which serves as support for the verticals or fixed contact elements 55. Molded into plate 81 are a number of grooves 82 which form channels for securing the stretched springs when they are in place. In these grooves are a number of teeth 83 which engage the stretched spring 55 between its turns to hold it in place. The two ends of the stretched spring are connected to the printed circuit card 50, as at 84, 85. Finally, a dust cover 86 (which may be made of a transparent plastic material, for example), is used to close the assembly.

Figure 3:
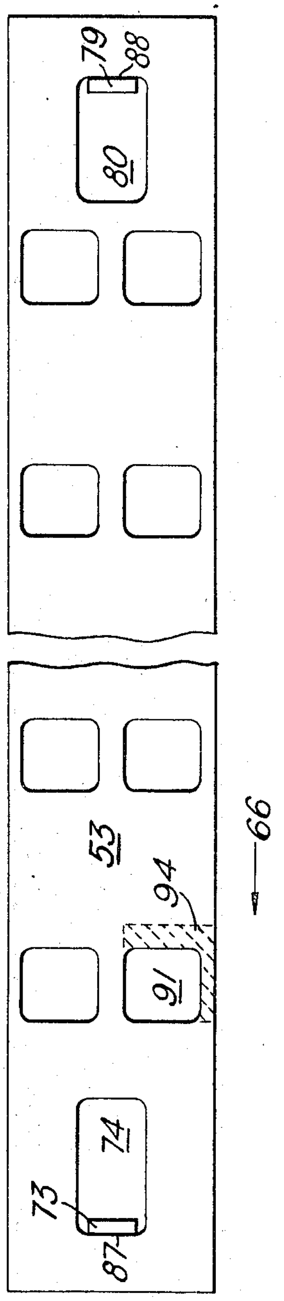
FIG. 3 is a large scale plan view of a select bar.
Figure 4:
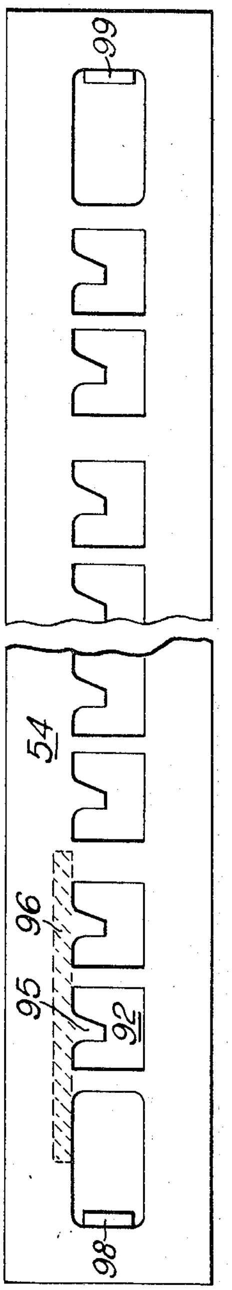
FIG. 4 is a large scale plan view of a hold or connection bar.

The operation of the crosspoint may be understood best from a study of FIGS. 3–9. FIGS. 3 and 4 show the select and hold bars, respectively, in plan view. By a comparison of the reference numerals in the various figures, the interrelationship of the parts should become apparent. For example, the select bar 53 is pulled to the left (in the direction 66) when the active end 73 of the armature bar 64 pulls against the leading edge 87 of the window 74 and returns to the right when the spring biased follower 79 is pushed against the trailing edge 88 of the window 80 by the return spring 77. The finger spring 56′ projects upwardly through the escapement windows 91, 92.

FIGS. 5–9 show a corner 94 of the escapement window 91 and tooth 95 in the escapement window 92 associated with a part 96 of the hold bar 54. The material 94, 96 are parts of the select and hold bars which are nearest the escapement windows 91, 92.

Figures 5, 6, 7, 8, 9:
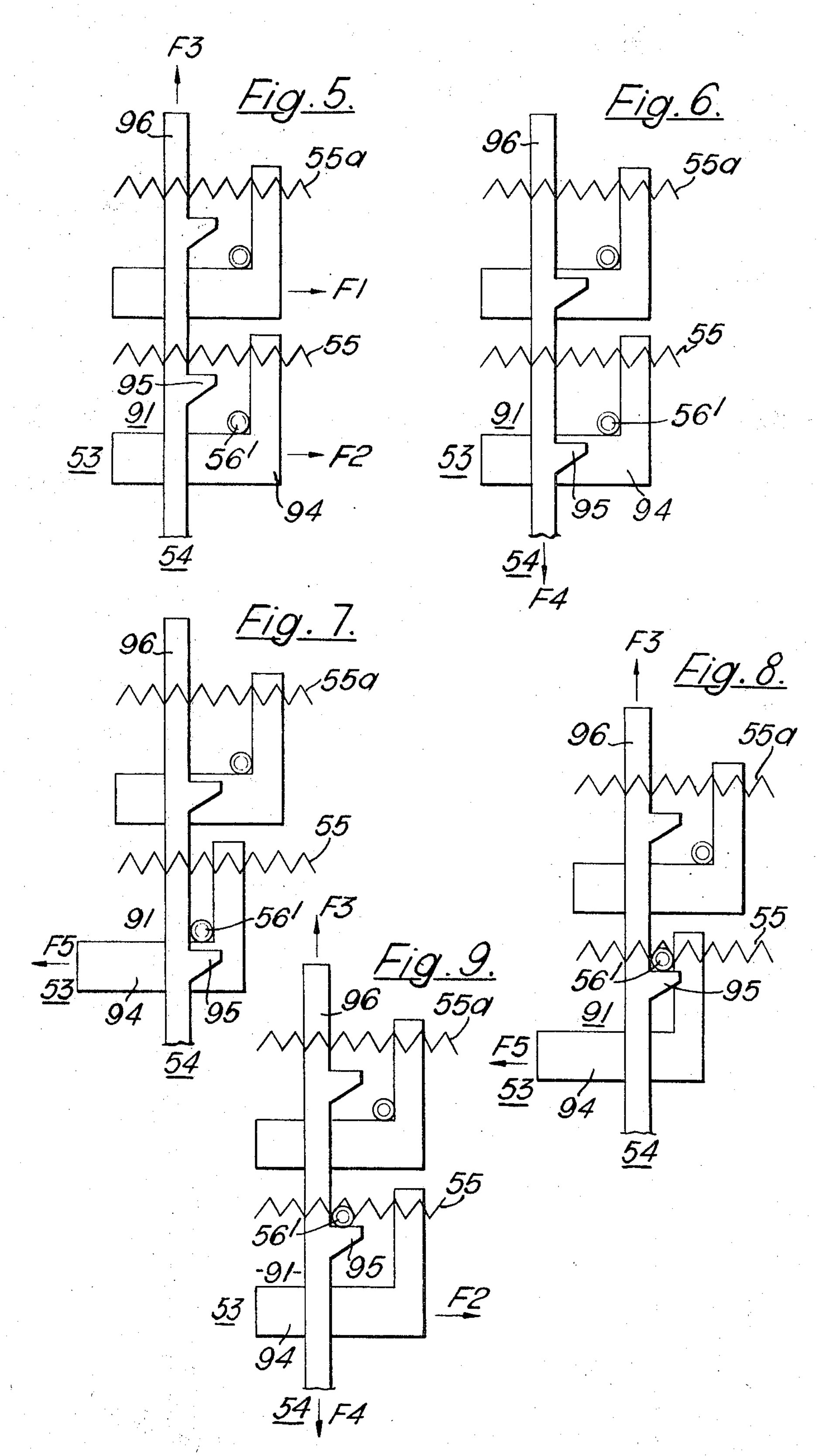
FIGS. 5 to 9 are stop motion views schematically showing the operation of the escapement windows in the select and hold bars during the different steps occurring in a sequence of operating a crosspoint.

FIG. 5 shows the normal condition with the finger spring 56′ in its rest position in a corner of window 91. The select and hold bars 53, 54 are also unoperated and in their rest or normal position. In this position, the select and hold bars 53 and 54 are pulled taut in the direction of the arrows F1, F2, and F3 by their respective return springs such as 77. This rest or normal position corresponds to that illustrated by FIG. 2 in which the upper end 79 of the spring follower exerts a traction force upon the trailing side 88 of the window 90 (FIG. 2) responsive to the force of the return spring 77. The armature 64 (FIG. 2) is held in abutment against the housing of the frame 52 by the leading edge 87 of the window 74 (FIG. 2). The hold bar 54 is also at rest, drawn in the direction of the arrow F3 by a return spring device which is similar to that described above for the select bars.

To operate a crosspoint, the hold bar 54 is moved before the select bar 53 is moved by force F4, as shown in FIG. 6. This movement occurs when a current impulse is applied to the electromagnet 58 (FIG. 1) of the hold bar 54. As the magnet attracts its armature 98 toward its core, the bar 54 is drawn in the direction of the arrow F4 against the force of the return spring (not shown, but similar to 77) associated with a follower 99 at the other end of the bar 54. At the end of its travel, all teeth, such as 95, of the hold bar 54 are disengaged from the corresponding movable finger spring contact elements, such as 56. If any of these finger springs had been previously operated, it would now return to a normal position under the urging of its own internal spring bias force.

In FIG. 7, the select bar 53 is moved in the direction F5 by pulsing a select magnet to cause a movement similar to that described above for the hold bar 54. As the select bar 53 is displaced in the direction of the arrow F5, the movable finger spring contact 56′ is pulled into a position opposite the tooth 95 of the hold bar 54.

In FIG. 8, the impulse which had operated the hold magnet 58 of the hold bar 54 has terminated so that the hold bar 54 returns into its rest position under the action of its return spring; this is a position identical with that of FIG. 5. This hold bar return to normal draws the finger spring contact element 56′ upward as viewed in FIG. 8. Since the impulse which feeds the select magnet 57 of the select bar 53 has not yet ceased, the movable finger spring 56′ slides along the side of window 94 while the return spring pulls the hold bar 54 back to its rest position. Finally, the movable finger spring contact 56′ comes into contact with and is actually pushed against two points formed into a V shape formed by two adjacent turns of the fixed vertical spring 55. The twin point connection is thus established with a contact pressure.

The last sequence in the process of operating a crosspoint is illustrated by FIG. 9. When the select impulse ends, the select magnet 57 releases and the select bar 53 is returned into the normal or rest position that it occupied in FIG. 5, responsive to the force F2 exerted upon it by its return spring 77.

After the completion of this sequence, the process of operating the crosspoint is finished. However, the closed crosspoint connection between the fixed or vertical spring 55 and the movable finger spring 56′ remains established although each of the magnets 57, 58 is no longer energized. The crosspoint is latched in this operated condition since the force of the return spring acting on the hold bar keeps the finger spring 56′ in its captured position. Thus, the connection is without any expenditure of electrical energy since it is mechanically assured by the bias of the return spring.

To release the crosspoint, it is only necessary to apply an impulse to the hold magnet 58 controlling the hold bar 54. This bar is momentarily pulled in the direction of the arrow F4 to the working position shown in FIG. 6. The finger spring 56′ is no longer captured by tooth 95 and pushed against the spring 55. Responsive to its own elasticity, and from the anchor angle 67 that is provided by the finger spring mounting, the finger spring contact element 56′ accompanies the bar 54 in its displacement move until it disengages the fixed vertical contact 55. Then, the finger spring 56′ slides on the tooth 95 and the side of the window 91 until it comes again to its rest position in the bottom right-hand corner of the escapement window in the select bar 53.

Figure 10:
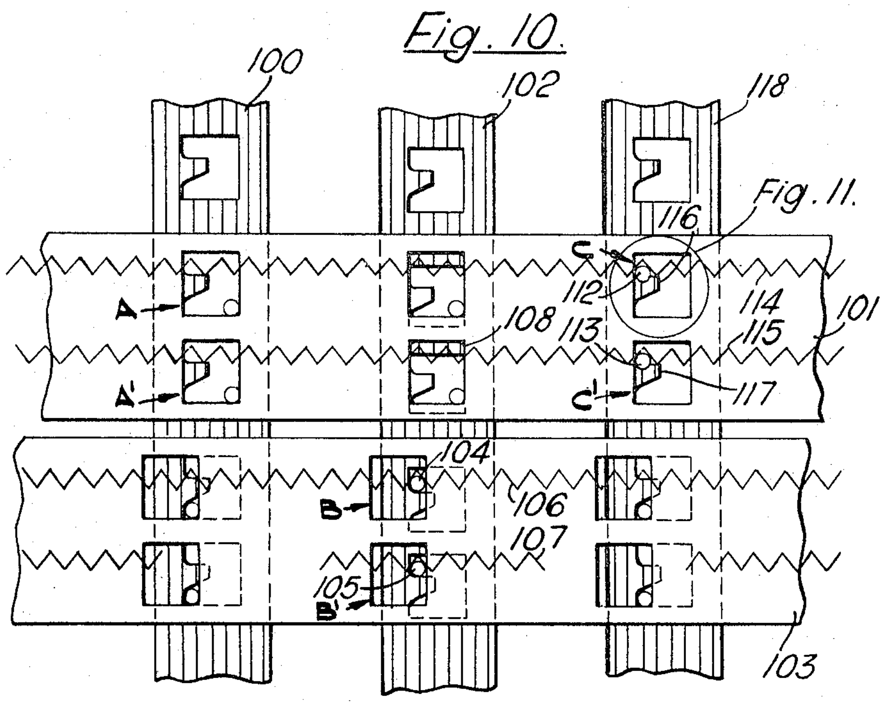
FIG. 10 is a plan view of the select and hold bars used to control a crosspoint switching matrix with the select and hold bars shown in several exemplary positions.

FIG. 10 shows some positions of the finger springs when the select and hold bars are normal and operated, respectively. The rest position is indicated by the two points A and A′ showing finger springs in unoperated positions at the crossing of the select bar 100 and hold bar 101. In this position, the windows in the select and hold bars are superimposed at the points B and B′ situated at the crossing of the bars 102 and 103, the hold bar 102 has returned to its normal or rest position, while the select bar 103 is still in its working position. The movable finger springs 104 and 105 have entered into the V slots of the vertical contact formed by the fixed springs 106 and 107.

It should be noted that then the escapement windows of the hold and select bars 102, 103 are no longer superimposed and that there is a displacement between them, (for example note the displacement at the top of the escapement window which is indicated by the shade lines at 108). This displacement occurs at the precise moment when the springs 55, 56 come into contact before the hold bar has finished its return motion. At the end of this return motion, the distance corresponding to the displacement 108 is translated into an elastic deformation of the movable finger springs in order to provide a maximum contact pressure between the fixed and movable springs of the operated crosspoint, as shown at the closed crosspoints C and C′. The movable finger spring contacts 112 and 113 are, respectively, in latched contact with the fixed vertical springs 114 and 115 and held in place by the teeth 116, 117 of the hold bar 118. In this position, C, C′ the escapement windows in the select and hold bars are exactly superimposed, as is the case shown by points A and A′.

Figure 11:
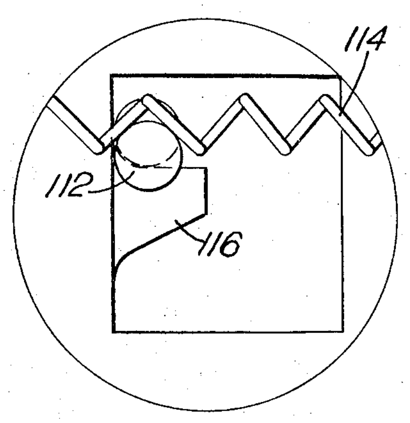
FIG. 11 is a very large scale view (taken from FIG. 10) showing the deformation of a contact element used to apply contact pressure in the operated position.

A magnified view of the crosspoint C is given in FIG. 11 in order to make the elastic deformation of the movable finger spring 112 more visible. At this moment, the pressure exerted by the tooth 116 of the hold bar on the finger spring 112 forces it to curve in and stabilize the contact force. It also prevents any relative sidewise sliding of the contact surfaces. On the other hand, a sliding occurs between springs 112, 114 as the finger spring 112 is pushed into its V slot. This sliding has the effect of improving the contact quality by a self-cleaning action.

By examining FIG. 11, it is noted that the holding or rest condition of the hold bars does not in any way change the possibility of releasing the movable finger springs. Regardless of the position in which a hold bar is found, it is always possible to move any intersecting select bar to select an idle set of movable finger springs which are not then taking part in a connection. Thus, the bar 100 is at rest while the bar 118 holds the closed crossing at the points C and C′. But the movable finger springs 104, 105 may be selected when the select bar 103 and hold bar 102 are moved to close the crosspoints B and B′.

While the principles of the invention have been described above in connection with specific apparatus and applications, it is to be understood that this description is made only by way of example and not as a limitation on the scope of the invention.

We claim:

1. A miniature crossbar switch comprising a printed circuit card, mechanical means orthogonally mounted on said printed card for making a selection of a predetermined intersection, said orthogonal means comprises a rectilinear array of flexible tapes normally held taut by a return spring, a plurality of electrical crosspoints adjacent each intersection of said orthogonal means, an escapement window at each intersection of said tapes, crosspoint operating means comprising a finger spring projecting through each escapement window, means for normally urging said crosspoint operating finger spring means to a released position, means for selectively moving said tapes by momentarily pulling them against the force of said return spring, means responsive to said momentarily pulling of the two tapes at the selected intersection against the force of said return spring for capturing the finger spring in the escapement window at said selected intersection, and means responsive to the capture of said finger spring for closing a crosspoint.

2. The switch of claim 1 and means responsive to momentarily pulling a tape in only a predetermined one direction of said orthogonal relationship for releasing a captured finger spring, thereby releasing any previously captured finger spring not appearing at the selected intersection.

3. The switch of claim 1 and means free of any intermediate couplers for directly operating the crosspoint at an intersection.

4. The switch of claim 1 and means for thereafter releasing said crosspoint by thereafter moving a first tape in a first orthogonal direction in said first direction.

5. The switch of claim 1 wherein said finger spring is a movable contact element with an inherent resilient bias, and means jointly responsive to said bias and to movement of said first tape means in said first direction for releasing said crosspoint.

6. The switch of claim 5 wherein said movable contact element is a coiled spring of predetermined length, said printed circuit board supporting said coiled spring at an end thereof, the other end of said coiled spring projecting outwardly from said printed circuit board and being free to move in any direction, said resilient bias resulting from the angle at which said coiled spring projects outwardly from said printed circuit board.

7. The switch of claim 1 and said escapement window comprises means associated with each of said tape means, said finger spring comprising a movable contact element being controlled by said escapement means, said escapement means causing said movable contact to be moved to either an operated or a released position responsive to the sequence in which said coordinate means are moved.

8. The switch of claim 7 wherein said escapement means comprises a tooth projecting into the escapement window in a first tape, said movable contact fitting into a first non-capture opening on one side of said tooth in said window when said crosspoint is released and into a second capture opening on the other side of said tooth in said window when said crosspoint is operated, said tooth being shaped so that said movable contact is captured in said second opening responsive to said sequence of movements of said coordinate means.

9. The switch of claim 8 and means jointly responsive to a subsequent movement of a first tape means extendeding in one orthogonal direction and an inherent resilience of said movable contact for causing said movable contact to escape from said capture position and to return to said first opening.

10. The switch of claim 1 wherein a tape in a first orthogonal direction includes a capture element for capturing said movable contact during said crosspoint operating movements, and a second tape in a second orthogonal direction includes a non-capture element which allows said movement of said second tape irrespective of whether said second tape is not associated with a captured movable element.

11. The switch of claim 1 and a stationary contact, said crosspoint operating means clamps said finger spring against said stationary contact, characterized in this said stationary contact is shaped to prevent said movable contact from escaping from said clamped position.

12. The switch of claim 11 wherein said shape of said stationary element establishes twin points of contact with said movable contact.

13. The switch of claim 1 wherein said finger spring is a movable contact which is a tightly wound coil spring and said stationary contact is a stretched coil spring.

14. The switch of claim 1 wherein said crosspoints include a movable finger spring member having an inherent bias for causing it to return to a normal position.

15. The switch of claim 14 wherein one of said tapes forms a hold bar comprising a toothed member for capturing said finger spring responsive to the orthogonal bar movements.

16. The switch of claim 1 and means for applying a contact pressure solely by the mechanical action of said return spring acting on a tape extending in one of said orthogonal directions.

References Cited

UNITED STATES PATENTS

| | | | |
|---|---|---|---|
| 1,303,084 | 5/1919 | Lundquist | 200—175 |
| 1,523,411 | 1/1925 | Forsberg | 200—175 |
| 2,118,935 | 5/1938 | Magrath | 200—175 |
| 2,942,069 | 6/1960 | Hatton et al. | 200—175 |
| 3,360,626 | 12/1967 | Vazquez | 200—153.8 XR |
| 2,338,181 | 1/1944 | Holden | 335—113 X |
| 3,293,502 | 12/1966 | Beierle | 335—152 X |
| 3,396,257 | 8/1968 | Vazquez. | |

ROBERT K. SCHAEFER, Primary Examiner

R. A. VANDERHYE, Assistant Examiner

U.S. Cl. X.R.

335—112